US012577962B2

(12) United States Patent
Guerin et al.

(10) Patent No.: US 12,577,962 B2
(45) Date of Patent: Mar. 17, 2026

(54) DEVICE FOR GUIDING A MAIN AIR FLOW FOR AN AIRCRAFT TURBINE ENGINE

(71) Applicant: SAFRAN HELICOPTER ENGINES, Bordes (FR)

(72) Inventors: Thomas Alexandre Guerin, Moissy-Cramayel (FR); Sylvain Borelle, Moissy-Cramayel (FR); Jacques Lucien Demolis, Moissy-Cramayel (FR); Nicolas Guillermo Lemoussu, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/560,598

(22) PCT Filed: May 10, 2022

(86) PCT No.: PCT/FR2022/050887
§ 371 (c)(1),
(2) Date: Nov. 13, 2023

(87) PCT Pub. No.: WO2022/243622
PCT Pub. Date: Nov. 24, 2022

(65) Prior Publication Data
US 2024/0255006 A1      Aug. 1, 2024

(30) Foreign Application Priority Data
May 18, 2021    (FR) ........................................ 2105151

(51) Int. Cl.
*F04F 5/16*          (2006.01)
*F02C 7/05*          (2006.01)
(Continued)

(52) U.S. Cl.
CPC .................. *F04F 5/16* (2013.01); *F02C 7/05* (2013.01); *F02C 7/057* (2013.01); *F04F 5/466* (2013.01); *F05D 2260/601* (2013.01)

(58) Field of Classification Search
None
See application file for complete search history.

(56) References Cited

U.S. PATENT DOCUMENTS 1,420,217 A * 6/1922 Richards ........... F16L 27/12751
                                                      285/302
1,430,303 A * 9/1922 Hartman ................... C02F 1/78
                                                      261/76
(Continued)

FOREIGN PATENT DOCUMENTS

FR          2541390 A1    8/1984
FR          3006998 A1    12/2014
(Continued)

OTHER PUBLICATIONS

International Search Report received for PCT Patent Application No. PCT/FR2022/050887, mailed on Aug. 10, 2022, 7 pages (3 pages of English Translation and 4 pages of Original Document).

*Primary Examiner* — Lorne E Meade
*Assistant Examiner* — Marc Amar
(74) *Attorney, Agent, or Firm* — WOMBLE BOND DICKINSON (US) LLP

(57)                ABSTRACT

A device for guiding a main air flow (F1) for an aircraft turbine engine, the device including a first air flowing pipe of a main air flow, the first pipe having a main axis, a plurality of ejectors of a secondary air flow located within the first pipe and configured to eject a secondary air flow and force the flow of the main air flow into the first pipe, the ejectors being distributed around the main axis, and a second air flowing pipe located at the outlet of the ejectors and
(Continued)

including one end which is connected to one end of the first pipe, wherein the second pipe includes a narrow end.

14 Claims, 4 Drawing Sheets

(51) Int. Cl.
F02C 7/057 (2006.01)
F04F 5/46 (2006.01)

(56) References Cited

U.S. PATENT DOCUMENTS

| | | | | |
|---|---|---|---|---|
| 3,521,431 A | * | 7/1970 | Buckley | F02C 7/052 |
| | | | | 55/306 |
| 3,694,107 A | | 9/1972 | Stein | |
| 3,951,418 A | * | 4/1976 | Dryer | F16J 15/20 |
| | | | | 285/271 |
| 4,321,910 A | * | 3/1982 | Devienne | F24V 99/00 |
| | | | | 126/649 |
| 4,702,071 A | * | 10/1987 | Jenkins | F02C 7/052 |
| | | | | 55/306 |
| 4,881,367 A | * | 11/1989 | Flatman | F02C 7/05 |
| | | | | 55/306 |
| 4,893,847 A | * | 1/1990 | Hess | F16L 27/073 |
| | | | | 285/263 |
| 4,928,480 A | | 5/1990 | Oliver et al. | |
| 5,584,511 A | * | 12/1996 | Gonzalez | F16L 27/11 |
| | | | | 285/271 |
| 8,276,392 B2 | * | 10/2012 | Van Der Woude | F02C 7/14 |
| | | | | 60/39.83 |
| 9,605,622 B2 | * | 3/2017 | Miller | F02C 6/04 |
| 2010/0005775 A1 | * | 1/2010 | Kipping | F01K 15/02 |
| | | | | 60/39.182 |
| 2010/0242486 A1 | * | 9/2010 | Jarmon | F02C 7/224 |
| | | | | 165/104.31 |
| 2012/0181355 A1 | * | 7/2012 | Corry | F23R 3/28 |
| | | | | 239/436 |
| 2016/0090912 A1 | * | 3/2016 | Joshi | F02C 7/052 |
| | | | | 55/306 |
| 2016/0138472 A1 | * | 5/2016 | Chartier | F02C 6/08 |
| | | | | 415/144 |
| 2018/0202591 A1 | * | 7/2018 | Tajiri | F16L 27/11 |
| 2021/0003095 A1 | * | 1/2021 | Tessiereau | F01D 25/20 |
| 2021/0387606 A1 | | 12/2021 | Fontalbat et al. | |
| 2022/0275733 A1 | * | 9/2022 | Hollingshead | B64D 33/02 |

FOREIGN PATENT DOCUMENTS

| | | | | | |
|---|---|---|---|---|---|
| FR | | 3011583 A1 | 4/2015 | | |
| FR | | 3022588 A1 | 12/2015 | | |
| FR | | 3087239 A1 | 4/2020 | | |
| GB | | 2257752 A | * 1/1993 | | F02C 7/052 |
| WO | | 2014/060656 A1 | 4/2014 | | |
| WO | | 2015/197974 A1 | 12/2015 | | |

* cited by examiner

[Fig.1]
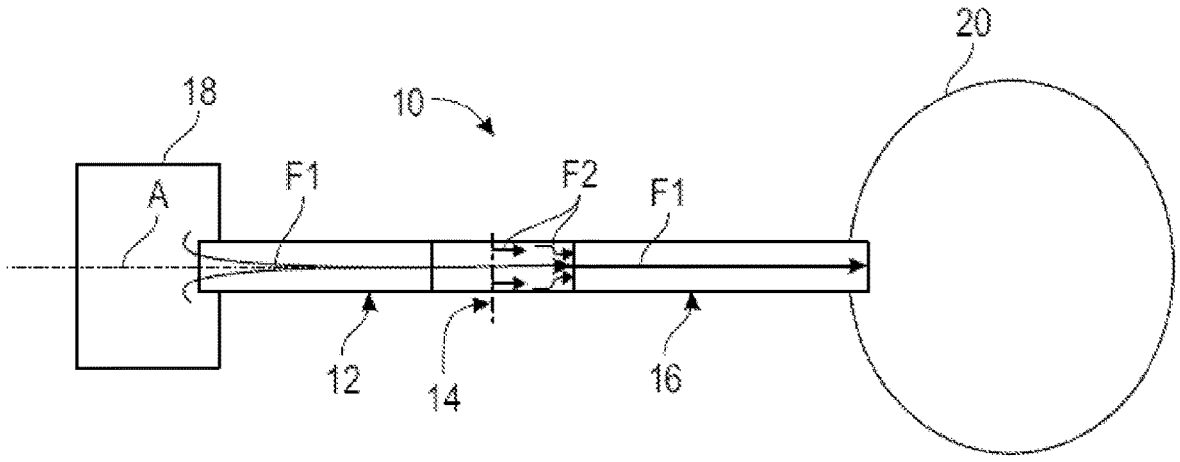
[Fig.2]
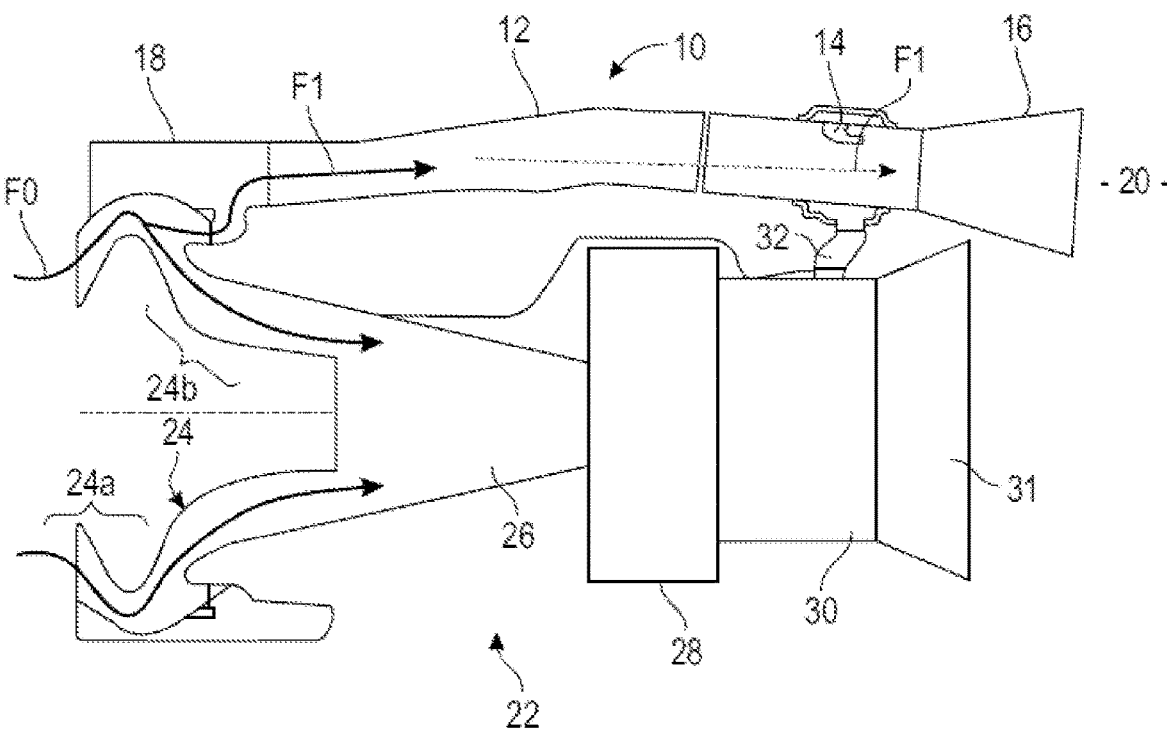

[Fig.3]
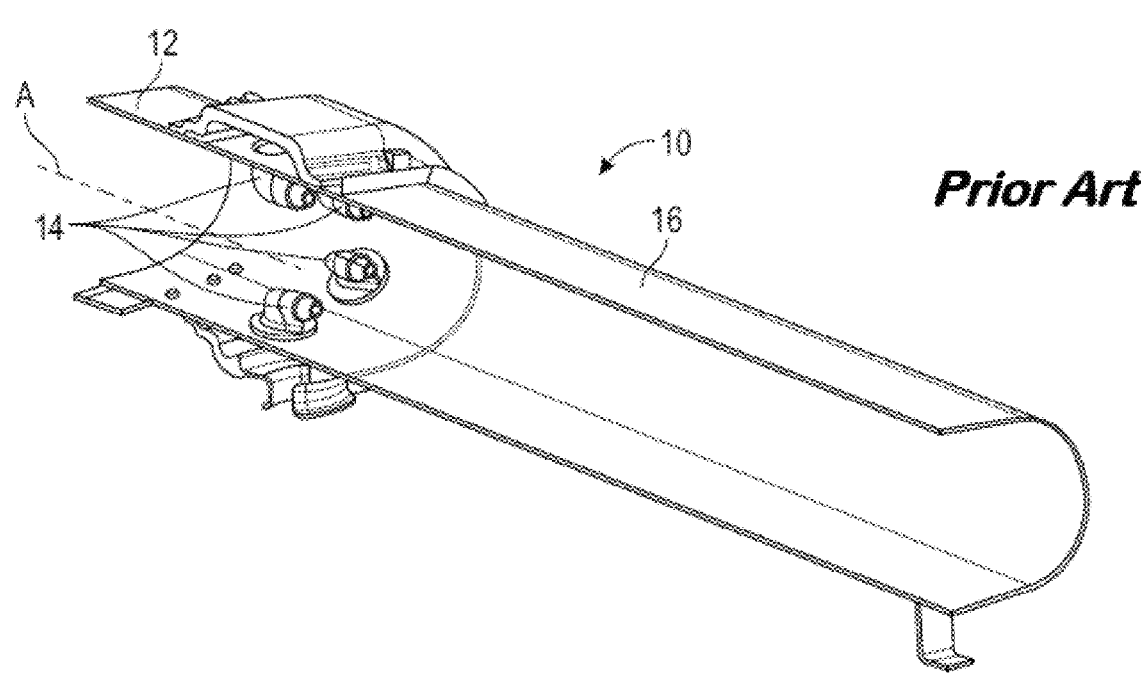
*Prior Art*
[Fig.4]
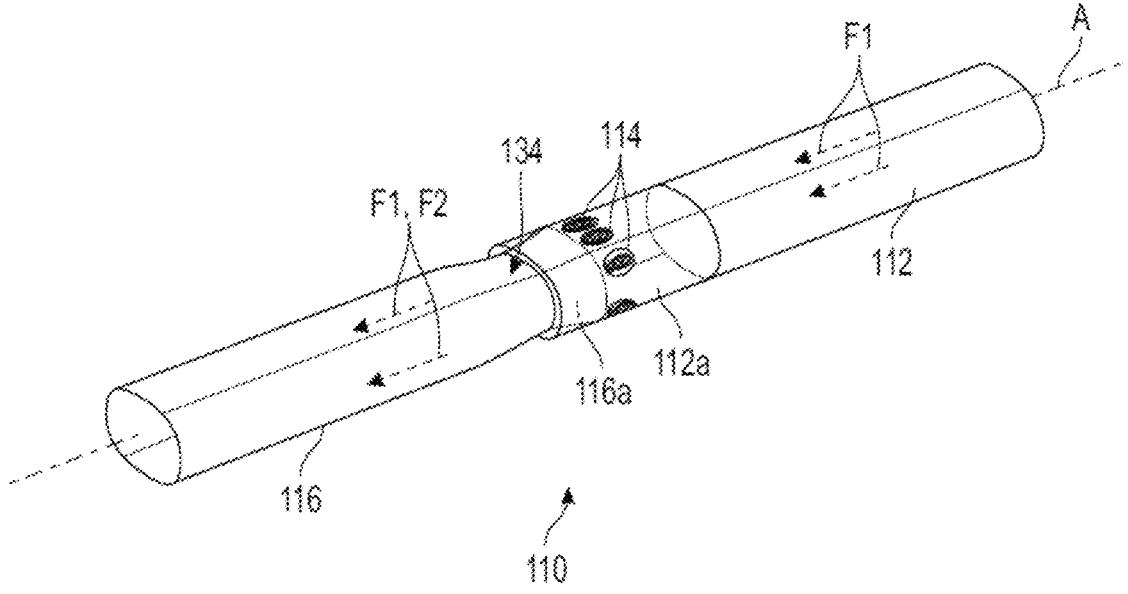

[Fig.5]
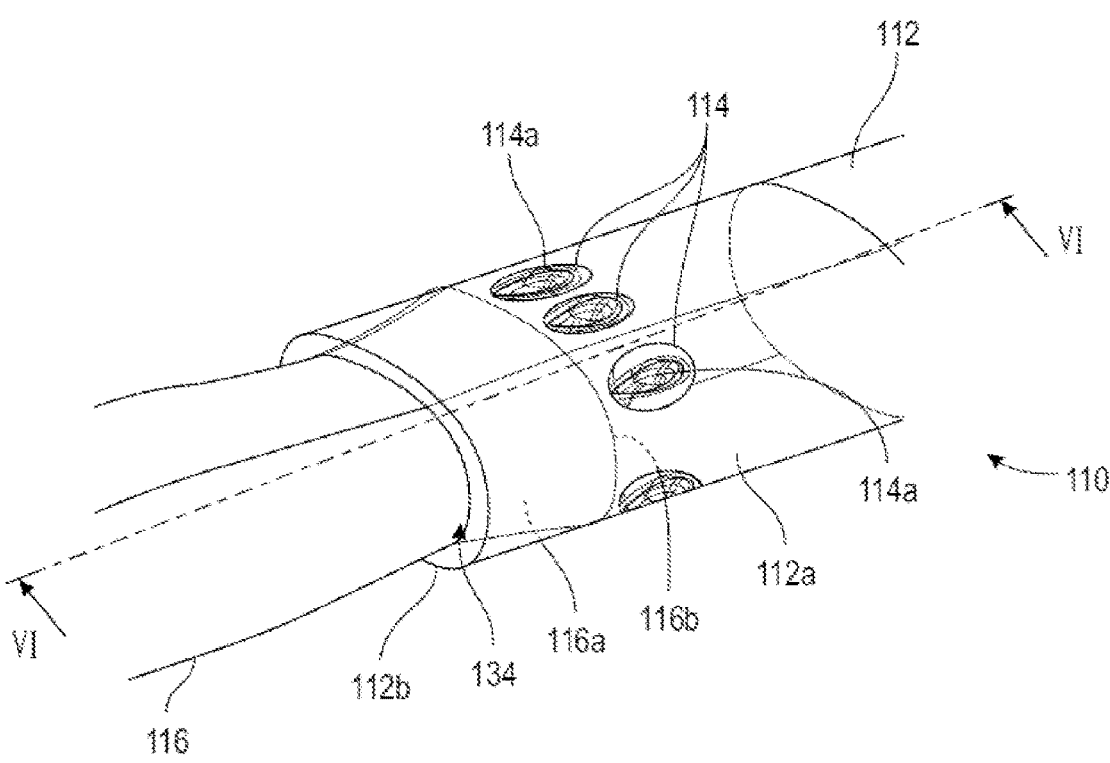
[Fig.6]
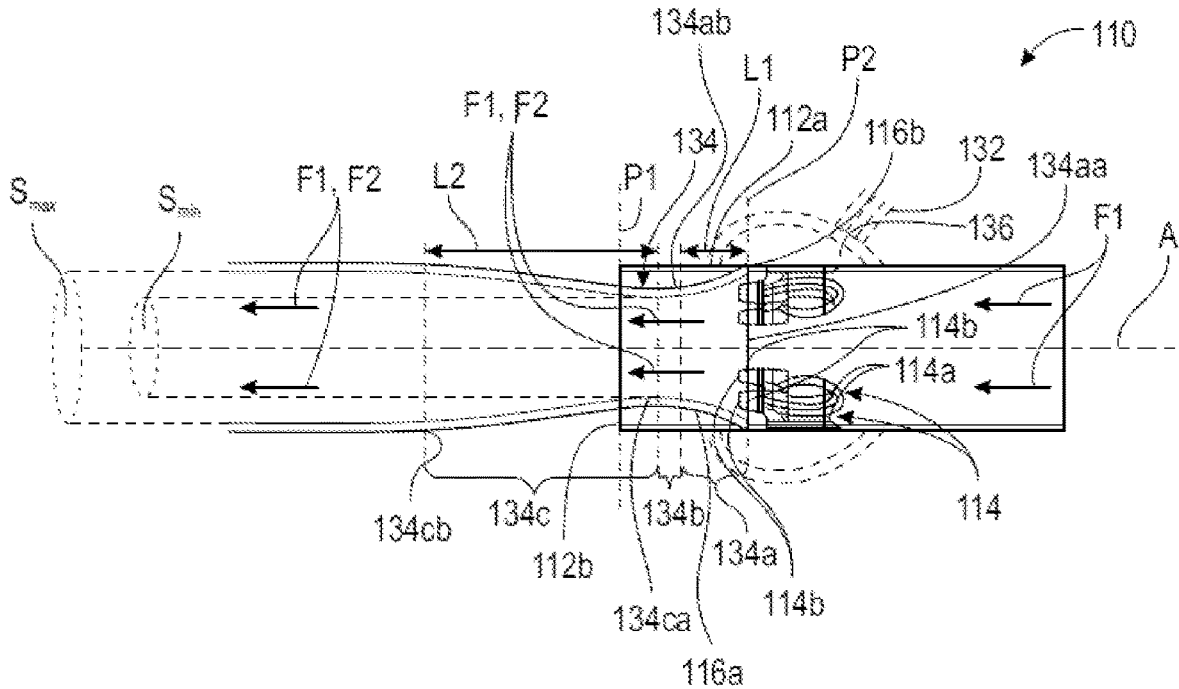

[Fig.7]
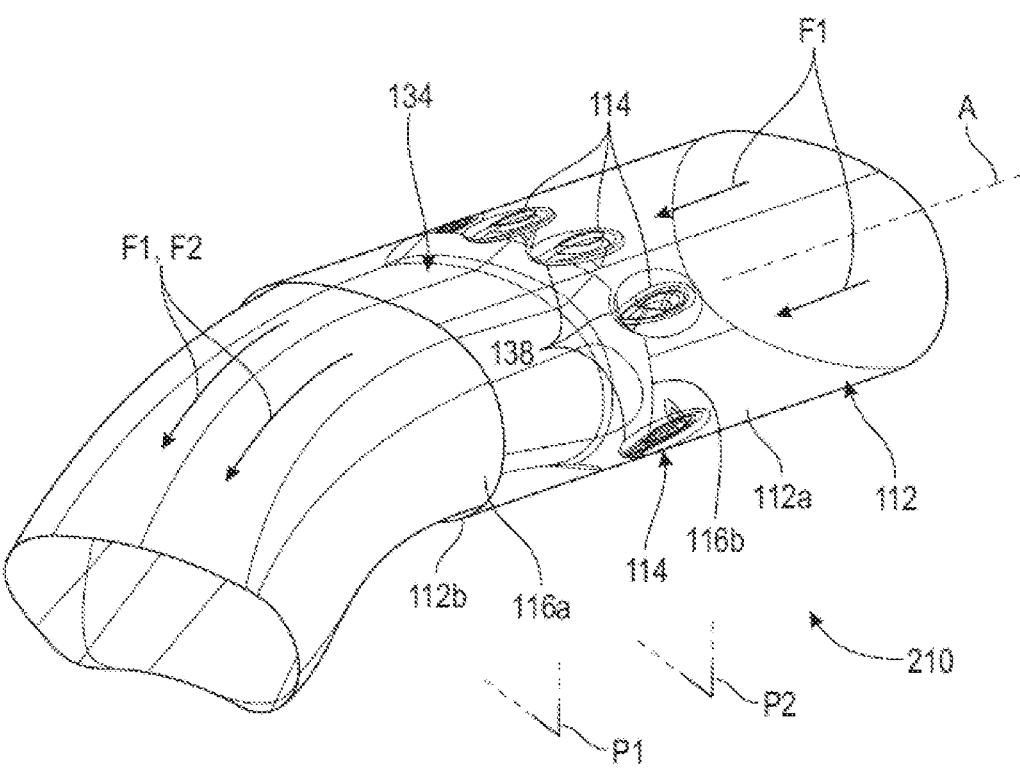
[Fig.8]
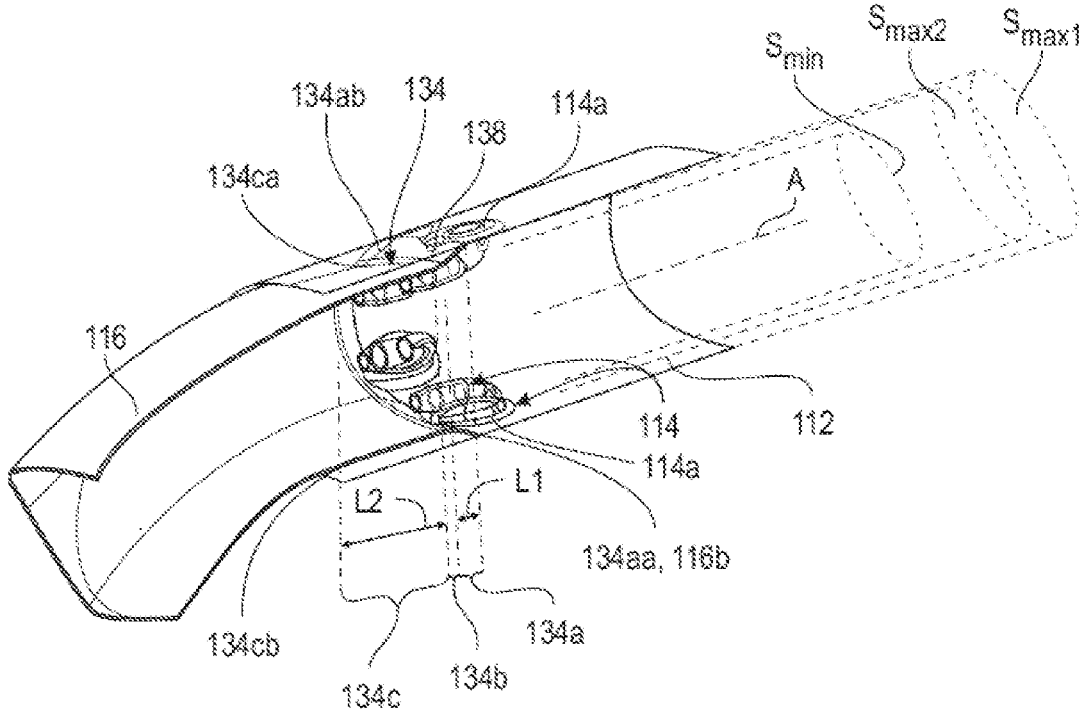

DEVICE FOR GUIDING A MAIN AIR FLOW FOR AN AIRCRAFT TURBINE ENGINE

TECHNICAL FIELD OF THE INVENTION

The present invention relates to a device for guiding a main air flow by a secondary air flow, this device being intended to equip an aircraft turbine engine.

TECHNICAL BACKGROUND

The technical background includes the documents FR-A1-3,006,998, U.S. Pat. No. 3,694,107, FR-A1-2,541,390, U.S. Pat. No. 4,928,480 and US-A1-2021/003,095.

It is known to drive a main air flow via a secondary air flow that is more energetic than the main air flow. A device for guiding a main air flow of this type typically comprises a pipe for the flow of a main air flow and ejectors of a secondary air flow located within the pipe and configured to eject the secondary air flow which will force the flow of the main air flow by viscous drag in that pipe.

The ejectors, also referred to as jet pumps, are supplied with high-pressure and/or high-temperature air. The difference in momentum between the two flows generates a viscous drag on the main air flow at lower pressure and therefore sucks it into the pipe. The following prior art documents describe several applications of this type of device: WO-A1-2014/060656, FR-A1-3 011 583, FR-A1-3 022 588 and FR-A1-3 087 239.

One of the problems with this type of device is controlling turbulence and pressure loss at the ejector outlet, which reduce the performance of the device and may mean that it has to be oversized for a given application. This then affects the pressure balance between the upstream of the primary flow, the secondary flow and the downstream of the exhaust of the system.

When the pressure upstream of the device decreases and/or the pressure losses and the turbulence are too great at the outlet of the ejector, the suction effect generated loses its effectiveness. At a certain threshold of pressure losses upstream of the system generated by the intake device, the main air flow reverses and the secondary air flow is sucked back upstream, which can damage parts in this area.

The invention proposes an improvement to this technology through the exhaust of the system, which has the effect of better channeling the jets from the ejectors, allowing the turbulence and pressure losses at their outlet to be reduced, thus making it more robust to pressure losses upstream of the system.

SUMMARY OF THE INVENTION

The invention relates to a device for guiding a main air flow for an aircraft turbine engine, this device comprising:
- a first pipe for the flow of a main air flow, this first pipe having a main axis,
- a plurality of ejectors of a secondary air flow located within the first pipe and configured to eject a secondary air flow and force the flow of the main air flow into this first pipe, said ejectors being distributed around said main axis on a tubular wall of one end of the first pipe, and
- a second exhaust pipe located at the outlet of the ejectors and comprising an end which is connected to the end of the first pipe and which directly receives said secondary flow to force the flow of the main air flow from the first pipe to the second pipe, characterised in that the end of the second pipe is engaged in the end of the first pipe and comprises a constriction which is at least partly located in this end of the first pipe.

The inventors have demonstrated that the centre of the exhaust pipe is conducive to aerodynamic recirculation and fluid re-aspiration leading, after a certain pressure loss threshold upstream of the system, to a flow reversal.

Rather than filling the centre of this pipe, the inventors propose forcing the primary and secondary flows into the centre of the pipe. To achieve this, the exhaust pipe comprises a constriction.

In the present application, "constriction" means a transversal shrinkage of the second pipe, resulting in a reduction in its passage cross-section. A constriction is therefore characterised by a narrowing of the pipe and is regular around the entire periphery of the pipe. The aim is to channel the primary and secondary flows so that they pass through a restricted section, thereby limiting the risk of turbulence and recirculation in this area.

The device according to the invention may comprise one or more of the following characteristics, taken alone or in combination with each other:
- the ejectors are at least three and preferably at least five in number;
- said constriction represents a reduction in the passage cross-section of between 10 and 90%, preferably between 30 and 70%, and more preferably of the order of 50%;
- said constriction comprises:
  - an intermediate section comprising a passage cross-section Smin,
  - an upstream section comprising at an upstream end a passage cross-section Smax or Smax1 substantially identical to the passage cross-section of the first pipe, and at a downstream end a passage cross-section Smin which is smaller than Smax, and
  - a downstream section located between the intermediate section and the rest of the second pipe, this downstream section comprising, at an upstream end, a passage cross-section Smin and, at a downstream end, a passage cross-section Smax substantially identical to the passage cross-section of the first pipe or a passage cross-section Smax2 between Smin and Smax1,
- and wherein the upstream section has a length L1 or axial dimension less than or equal to a length L2 or axial dimension of the downstream section;
- L2=K.L1 with K between 1 and 10, and preferably between 3 and 5;
- the end of the second pipe comprises a peripheral edge which is flush with the tubular wall of the first pipe;
- the end of the second pipe comprises a peripheral edge which extends in a plane perpendicular to said main axis, said plane passing through outlets of the ejectors or upstream of these outlets;
- said plane passes upstream of these outlets and said peripheral edge comprises notches configured to each receive a base of one of said ejectors;
- said second pipe has a generally straight or bent shape;
- said second pipe has a generally non-circular passage cross-section; alternatively, this cross-section may be circular;
- said second pipe is integrally formed, preferably of metal.

The invention also relates to a turbine engine, in particular for an aircraft, comprising a device as described above.

The invention also relates to a helicopter comprising a device or turbine engine as described above.

Advantageously, the turbine engine comprises, from upstream to downstream, in the orientation of the gas flow in the turbine engine, an air inlet, at least one compressor, a combustion chamber, at least one turbine and an exhaust, said air inlet being equipped with a particulate trap which is connected to said device.

BRIEF DESCRIPTION OF THE FIGURES

Further characteristics and advantages will be apparent from the following description of a non-limiting embodiment of the invention with reference to the appended drawings in which:

FIG. 1 is a very schematic view of a device guiding a main air flow for an aircraft turbine engine;

FIG. 2 is a schematic axial sectional view of an aircraft turbine engine fitted with a device of the type shown in FIG. 1;

FIG. 3 is a schematic perspective view in axial section of a device for guiding a main air flow, according to the technique prior to the present invention;

FIG. 4 is a schematic perspective view of a device for guiding a main air flow, according to one embodiment of the invention;

FIG. 5 is a larger scale view of part of the device shown in FIG. 4;

FIG. 6 is a sectional view along line VI-VI of FIG. 4;

FIG. 7 is an alternative embodiment of the device according to the invention; and FIG. 8 is a sectional view of the device along the main axis of FIG. 7.

DETAILED DESCRIPTION OF THE INVENTION

FIG. 1 is a very schematic representation of a device 10 for guiding a main air flow F1 by a secondary air flow F2 for an aircraft turbine engine.

The device 10 comprises:

a first pipe 12 for the flow of the main air flow F1, this first pipe having a main axis A, a plurality of ejectors 14 of the secondary air flow F2, which are located within the first pipe 12 and configured to eject the secondary air flow F2 and force the flow of the main air flow F1 into the first pipe 12, and a second exhaust pipe 16 located at the outlet of the ejectors 14 and connected to the first pipe 12.

The device 10 is generally connected upstream (with reference to the flow of the flows F1, F2 in the device 10) to an enclosure 18, such as an enclosure to be purged or an enclosure forming a particulate trap, of the aircraft turbine engine.

The device 10 is generally connected downstream to the outside 20 of the turbine engine.

The first pipe 12 has a generally elongated and rectilinear shape, although this is not restrictive. In the same way, the second pipe 16 has a generally elongated and rectilinear shape but can be bent in variant.

The ejectors 14 are connected to a high-pressure and/or high-temperature air supply source and generate a secondary air flow F2 in the first pipe 12 which, by viscous friction, guides a flow of the main flow F1 in the pipe 12. The flows F1, F2 then flow in the second pipe 16 to the outside 20 of the turbine engine.

The technology of this type of ejector or jet pump is well known to the person skilled in the art and therefore does not need to be detailed.

FIG. 2 illustrates an example of the installation of a device 10 in a turbine engine 22, in this case of a helicopter-type aircraft.

The turbine engine 22 typically comprises, from upstream to downstream, an air inlet 24, at least one compressor 26, a combustion chamber 28, at least one turbine 30 and an exhaust 31.

The air inlet 24 is annular in shape and comprises an upstream segment 24*a* in the shape of a truncated cone which flares out towards the downstream, and a downstream segment 24*b* in the shape of a truncated cone which flares out towards the upstream. In other words, the air inlet 24 has a maximum diameter at the junction between these segments 24*a*, 24*b*.

The air flow F0 entering the air inlet 24 therefore first flows radially from the inside towards the outside in the first segment 24*a* of the air inlet 24, then radially from the outside towards the inside in the second segment 24*b* and up to the compressor 26. As the air flow F0 flows through the first segment 24*a*, the particles potentially present in this air flow are conveyed by inertia into the enclosure 18 which is connected to the external periphery of the air inlet 24.

The device 10 extends along and to one side of the turbine engine 22. In the example shown, the first pipe 12 extends from the enclosure 18 and the air inlet 24 to the exhaust 31. The ejectors 14 are mounted in the first pipe 12 at the level of the turbine 30 and are supplied with air under pressure and/or temperature taken directly from the turbine 30 by appropriate sampling means 32. The second pipe 16 extends downstream of the first pipe 12 and the turbine 30 and, for example, at the level of an exhaust 31, for example in the form of an exhaust gas outlet nozzle.

The device 10 in FIG. 2 is therefore associated with an enclosure 18 and an air inlet 24*a* forming a particulate trap at the inlet of the turbine engine 22.

FIG. 3 illustrates a device 10 in the prior art. It can be seen that the second pipe 16 is formed by a tubular wall which has a constant passage cross-section over its entire axial length. It can also be seen that the ejectors 14 are distributed around the axis A of the first pipe 12. This technology is not satisfactory because of the turbulence and pressure losses that occur during operation at the outlet of the ejectors, as mentioned above, making it very sensitive to pressure losses upstream of the system, leading to a re-aspiration of the primary and secondary flows.

The present invention offers a solution to this problem with a device 110, an embodiment of which is shown in FIGS. 4 to 6.

The device 110 comprises:

a first pipe 112 for the flow of the main air flow F1, this first pipe 112 having a main axis A, a plurality of ejectors 114 of the secondary air flow F2, which are located within the first pipe 112 and configured to eject the secondary air flow F2 and force the flow of the main air flow F1 into the first pipe 112, and a second exhaust pipe 116 located at the outlet of the ejectors 114 and connected to the first pipe 112.

The first pipe 112 is generally tubular in shape and may be straight or bent. It comprises a longitudinal end 112*a* in which the ejectors 114 are located and which comprises a free peripheral edge 112*b*.

The ejectors 114 are located in the first pipe 112, close to this peripheral edge 112*b*, and each have a generally bent shape in the example shown. Each ejector 114 is tubular and comprises an end 114a connected to an orifice (not visible) passing through the pipe 112, and an opposite end 114b which is narrowed to form a nozzle and which is oriented in a direction parallel to the axis A and towards the peripheral edge 112b (FIG. 6).

The ends 114a of the ejectors 114 are connected via the aforementioned orifices of the pipe 112 to an annular collector 136 which is mounted around the pipe 112 and which is connected to sampling means 132 (FIG. 6) comparable to the aforementioned sampling means 32.

The second pipe 116 comprises an end 116a which is connected to the end 112a of the first pipe 112 and which directly receives the secondary flow F2 to force the flow of the main air flow F1 from the first pipe 112 to the second pipe 116.

According to the invention, the end 116a of the second pipe 116 comprises a constriction 134, i.e., a reduction in its passage cross-section. The constriction 134 channels the flow of the primary F1 and secondary F2 flows, thus eliminating the risk of turbulence and recirculation in this area.

The passage reduction of the constriction 134 is of the order of 10 to 90%, preferably between 30 and 70%, and more preferably of the order of 50%.

In the example shown (FIG. 6), the constriction 134 comprises three parts or sections, namely:
an intermediate section 134b comprising a passage cross-section Smin,
an upstream section 134a located between the intermediate section 134b and the ejectors 114, this upstream section 134a comprising, at an upstream end 134aa, a passage cross-section Smax substantially identical to the passage cross-section of the first pipe 112, and, at a downstream end 134ab, a passage cross-section Smin which is smaller than Smax, and
a downstream section 134c located between the intermediate section 134b and the rest of the second pipe 116, this downstream section 134c comprising, at an upstream end 134ca, a passage cross-section Smin and, at a downstream end 134cb, a passage cross-section Smax substantially identical to the passage cross-section of the first pipe 112.

The upstream section 134a has a length L1 or axial dimension less than a length L2 or axial dimension of the downstream section 134c. L2=K.L1 with K between 1 and 10, and preferably between 3 and 5.

In the example shown, the end 116a of the second pipe 116 is engaged in the end 112a of the first pipe 112. The engagement length here is greater than L1. The end 112a surrounds the sections 134a, 134b and even part of the section 134c.

The peripheral edge 112b of the first pipe 112 is located in a plane P1 which is perpendicular to the axis A and passes substantially through the downstream section 134c.

The end 116a of the second pipe 116 comprises a peripheral edge 116b which extends in a plane P2 which is perpendicular to the axis A and passes substantially through the ends 114b or outlets of the ejectors 114 or upstream of these outlets (FIG. 6).

The second pipe 116 is preferably integrally made, for example by additive manufacturing. The pipe 116 is made of metal, for example. It has a generally straight shape in the example shown and a generally non-circular passage cross-section. This shape is flattened, for example oval or elliptical.

FIGS. 7 and 8 illustrate an alternative embodiment of the device 110 according to the invention.

The device 210 in FIGS. 7 and 8 has many similarities to the device 110 in FIGS. 4 to 6.

The foregoing description made in relation to the device 110 therefore applies to the device 210, insofar as it does not conflict with or contradict what follows.

The pipe 112 and the ejectors 116 associated with the device 210 are similar to those described above.

The second pipe 116 has a generally bent shape in the example shown and a generally non-circular passage cross-section. This shape is flattened, for example oval or elliptical.

The constriction 134 comprises three parts or sections, namely:
an intermediate section 134b comprising a passage cross-section Smin,
an upstream section 134a located between the intermediate section 134b and the ejectors 114, this upstream section 134a comprising, at an upstream end 134aa, a passage cross-section Smax1 substantially identical to the passage cross-section of the first pipe 112, and, at a downstream end 134ab, a passage cross-section Smin which is smaller than Smax, and
a downstream section 134c located between the intermediate section 134b and the rest of the second pipe 116, this downstream section 134b comprising a passage cross-section Smin at an upstream end 134ba, and a passage cross-section Smax2 between Smin and Smax1 at a downstream end 134bb.

The end 116a of the second pipe 116, which is engaged in the end 112a of the first pipe 112, comprises a peripheral edge 116b which extends in a plane P2 which is perpendicular to the axis A and passes upstream of the ends 114b or outlets of the ejectors 114 (FIG. 8).

This peripheral edge 116b or the upstream section 134a comprises notches 138, in this case in the shape of a C or U, which are distributed around the axis A.

The number of notches 138 is equal to the number of ejectors 114 and are positioned around the axis A as a function of the position of the ejectors 114 around the axis A so that the bases of the ejectors 114, i.e., their ends 114a, are at least partly embedded or engaged in these notches 138.

The invention thus proposes a device 110, 210 for guiding a main air flow for an aircraft turbine engine, in which the exhaust pipe 116 comprises a constriction 134 at the level of the outlets of the ejectors of a secondary air flow.

The invention claimed is:
1. A device for guiding a main air flow for an aircraft turbine engine, this device comprising:
a first pipe for the flow of a main air flow, this first pipe having a main axis,
a plurality of ejectors of a secondary air flow located inside the first pipe and configured to eject a secondary air flow and force the flow of the main air flow in this first pipe, said ejectors being distributed around said main axis on a tubular wall of one end of the first pipe, and
a second exhaust pipe located at outlets of the ejectors and comprising an end which is connected to the end of the first pipe and which directly receives said secondary flow to force the flow of the main air flow from the first pipe to the second pipe,
wherein the end of the second pipe is engaged in the end of the first pipe, in such a way that a peripheral edge of the end of the second pipe is in contact with the tubular wall of the end of the first pipe, the second pipe comprising a constriction which is at least partly located in said end of the first pipe, and wherein the peripheral edge extends in a plane perpendicular to said main axis, said plane passing upstream of said outlets and said peripheral edge comprising notches configured to each receive a base of one of said ejectors.

2. The device according to claim 1, wherein said constriction represents a reduction in the passage cross-section of between 10 and 90%.

3. The device according to claim 1, wherein said constriction comprises:

an intermediate section comprising a passage cross-section Smin, an upstream section located between the intermediate section and the ejectors, this upstream section comprising at an upstream end a passage cross-section Smax or Smax1 substantially identical to a passage cross-section of the first pipe, and at a downstream end a passage cross-section Smin which is smaller than Smax, and a downstream section located between the intermediate section and the rest of the second pipe, this downstream section comprising, at an upstream end, a passage cross-section Smin and, at a downstream end, a passage cross-section Smax substantially identical to the passage cross-section of the first pipe or a passage cross-section Smax2 between Smin and Smax1, and wherein the upstream section has a length L1 or axial dimension less than or equal to a length L2 or axial dimension of the downstream section.

4. The device according to claim 3, wherein L2=K.L1 with K between 1 and 10.

5. The device according to claim 3, wherein the intermediate section is located in the end of the first pipe.

6. The device according to claim 1, wherein the end of the second pipe comprises a peripheral edge which is flush with the tubular wall of the end of the first pipe.

7. The device according to claim 1, wherein said second pipe has a generally straight or bent shape.

8. The device according to claim 1, wherein said second pipe has a generally non-circular passage cross-section.

9. The device according to claim 1, wherein said second pipe is integrally formed.

10. A turbine engine, in particular for an aircraft, comprising a device according to claim 1.

11. The turbine engine according to claim 8, wherein the engine comprises, from upstream to downstream, in the orientation of the gas flow in the turbine engine, an air inlet, at least one compressor, a combustion chamber, at least one turbine and an exhaust, said air inlet being equipped with a particulate trap which is connected to said device.

12. A device for guiding a main air flow for an aircraft turbine engine, this device comprising:

a first pipe for the flow of a main air flow, this first pipe having a main axis, a plurality of ejectors of a secondary air flow located inside the first pipe and configured to eject a secondary air flow and force the flow of the main air flow in this first pipe, said ejectors being distributed around said main axis on a tubular wall of one end of the first pipe, and a second exhaust pipe located at outlets of the ejectors and comprising an end which is connected to the end of the first pipe and which directly receives said secondary flow to force the flow of the main air flow from the first pipe to the second pipe, wherein the end of the second pipe is engaged in the end of the first pipe, and a peripheral edge of the end of the first pipe is located downstream of a peripheral edge of the end of the second pipe, wherein the second pipe comprises a constriction which is at least partly located in said end of the first pipe, wherein the peripheral edge of the end of the second pipe extends in a plane perpendicular to said main axis, said plane passing upstream of said outlets and said peripheral edge comprising notches configured to each receive a base of one of said ejectors, and wherein a maximum cross-section of the second pipe at the peripheral edge of the second pipe is greater than a maximum cross-section of the second pipe at the peripheral edge of the end of the first pipe, wherein said constriction comprises:

an intermediate section comprising a passage cross-section Smin, an upstream section located between the intermediate section and the ejectors, this upstream section comprising at an upstream end a passage cross-section Smax or Smax1 substantially identical to a passage cross-section of the first pipe, and at a downstream end a passage cross-section Smin which is smaller than Smax, and a downstream section located between the intermediate section and the rest of the second pipe, this downstream section comprising, at an upstream end, a passage cross-section Smin and, at a downstream end, a passage cross-section Smax substantially identical to the passage cross-section of the first pipe or a passage cross-section Smax2 between Smin and Smax1, and wherein the upstream section has a length L1 or axial dimension less than or equal to a length L2 or axial dimension of the downstream section, the length L2 being defined by L2=K.L1 with K between 3 and 5.

13. The device according to claim 12, wherein the maximum cross-section of the second pipe at the peripheral edge is equal to a cross-section of the tubular wall.

14. The device according to claim 12, wherein the maximum cross-section of the second pipe at the peripheral edge of the end of the first pipe is delimited by an external contour of the second pipe.

* * * * *